(12) United States Patent
Bai et al.

(10) Patent No.: US 9,329,339 B2
(45) Date of Patent: May 3, 2016

(54) PLASMONIC DETECTOR AND METHOD FOR MANUFACTURING THE SAME

(75) Inventors: Ping Bai, Connexis (SG); Mingxia Gu, Connexis (SG); Erping Li, Connexis (SG)

(73) Assignee: AGENCY FOR SCIENCE, TECHNOLOGY AND RESEARCH, Connexis (SG)

( * ) Notice: Subject to any disclaimer, the term of this patent is extended or adjusted under 35 U.S.C. 154(b) by 962 days.

(21) Appl. No.: 13/394,119

(22) PCT Filed: Sep. 2, 2010

(86) PCT No.: PCT/SG2010/000319
§ 371 (c)(1),
(2), (4) Date: May 3, 2012

(87) PCT Pub. No.: WO2011/028179
PCT Pub. Date: Mar. 10, 2011

(65) Prior Publication Data
US 2012/0205767 A1    Aug. 16, 2012

(30) Foreign Application Priority Data
Sep. 2, 2009    (SG) .................................. 200905828

(51) Int. Cl.
*H01L 31/0232* (2014.01)
*H01L 31/18* (2006.01)
*G02B 6/122* (2006.01)
*B82Y 20/00* (2011.01)

(52) U.S. Cl.
CPC ............... *G02B 6/1226* (2013.01); *B82Y 20/00* (2013.01)

(58) Field of Classification Search
CPC .............................. G02B 5/008; G02B 6/1226
USPC ............... 250/214 R, 214.1, 227.11, 227.32, 250/336.1, 338.1, 362, 370.01, 370.12, 250/371; 257/431, 432, 459, E31.127; 438/57, 69; 385/30, 129, 130; 977/932, 977/953, 954
See application file for complete search history.

(56) References Cited

U.S. PATENT DOCUMENTS

| | | | |
|---|---|---|---|
| 5,625,729 A * | 4/1997 | Brown | 385/31 |
| 5,696,372 A * | 12/1997 | Grober et al. | 250/216 |
| 6,178,275 B1 * | 1/2001 | Nerses et al. | 385/14 |
| 7,129,467 B2 * | 10/2006 | Wincheski et al. | 250/214.1 |
| 7,177,515 B2 * | 2/2007 | Estes et al. | 385/130 |

(Continued)

FOREIGN PATENT DOCUMENTS

DE    10344 915 A1    4/2005

OTHER PUBLICATIONS

Collin, S., et al., "Light confinement and absorption in metal-semiconductor-metal nanostructures," *Proceedings of the SPIE*, vol. 5734, 2005, pp. 1-12.

(Continued)

*Primary Examiner* — John Lee
(74) *Attorney, Agent, or Firm* — Blakely Sokoloff Taylor & Zafman LLP

(57) ABSTRACT

A plasmonic detector and method for manufacturing a plasmonic detector. The plasmonic detector comprises two nanoscale metallic rods coupled to a bias voltage; a nanoscale cavity formed between adjacent ends of the two nanoscale metallic rods; and an absorption material disposed in the nanoscale cavity for converting an electromagnetic field to an electric current for outputting via the nanoscale metallic rods.

24 Claims, 8 Drawing Sheets

(56) References Cited

U.S. PATENT DOCUMENTS

| | | | |
|---|---|---|---|
| 7,254,151 B2* | 8/2007 | Lieber et al. | 372/44.01 |
| 7,351,997 B2* | 4/2008 | Ofek | 257/39 |
| 7,418,179 B2* | 8/2008 | Estes et al. | 385/130 |
| 7,701,025 B2* | 4/2010 | Crouse | 257/436 |
| 8,120,014 B2* | 2/2012 | Nabet et al. | 257/21 |
| 8,223,330 B2* | 7/2012 | Natelson et al. | 356/301 |
| 8,809,834 B2* | 8/2014 | Ahn | 257/14 |
| 8,866,007 B2* | 10/2014 | Atwater | 136/257 |
| 2003/0179974 A1* | 9/2003 | Estes et al. | 385/2 |
| 2004/0232406 A1* | 11/2004 | Weiss et al. | 257/35 |
| 2005/0099345 A1* | 5/2005 | von Klitzing et al. | 343/703 |
| 2006/0081889 A1* | 4/2006 | Shur et al. | 257/221 |
| 2006/0289761 A1* | 12/2006 | Nabet et al. | 250/336.1 |
| 2007/0289623 A1* | 12/2007 | Atwater | 136/252 |
| 2008/0066549 A1* | 3/2008 | Oldham et al. | 73/579 |
| 2008/0093529 A1* | 4/2008 | Miles et al. | 250/200 |
| 2008/0151603 A1* | 6/2008 | Radosavljevic | B82Y 10/00 365/151 |
| 2008/0266556 A1* | 10/2008 | Kamins et al. | 356/301 |
| 2008/0272302 A1* | 11/2008 | Frey et al. | 250/336.2 |
| 2009/0140128 A1* | 6/2009 | Oldham et al. | 250/216 |
| 2009/0236614 A1* | 9/2009 | Puscasu et al. | 257/84 |
| 2010/0067016 A1* | 3/2010 | Ueno et al. | 356/445 |
| 2010/0084630 A1* | 4/2010 | Kukushkin et al. | 257/15 |
| 2010/0097273 A1* | 4/2010 | Biris et al. | 343/700 R |
| 2010/0102256 A1* | 4/2010 | Andrew et al. | 250/505.1 |
| 2011/0001124 A1* | 1/2011 | Ahn | 257/14 |
| 2011/0001125 A1* | 1/2011 | Ahn | 257/14 |
| 2011/0250402 A1* | 10/2011 | Oldham et al. | 428/172 |
| 2011/0284723 A1* | 11/2011 | Cao et al. | 250/208.1 |
| 2012/0205767 A1* | 8/2012 | Bai et al. | 257/432 |

OTHER PUBLICATIONS

Liu, S.-D., et al., "Surface plasmon propagation in a pair of metal nanowires coupled to a nanosized optical emitter," *Optics Letters*, vol. 33, No. 8, Apr. 15, 2008, pp. 851-853.

* cited by examiner

PLASMONIC DETECTOR AND METHOD FOR MANUFACTURING THE SAME

This is a non-provisional application claiming the benefit of International Application Number PCT/SG2010/000319 filed Sep. 2, 2010.

FIELD OF INVENTION

The present invention broadly relates to a plasmonic detector and method for manufacturing a plasmonic detector.

BACKGROUND

Both electronic and optical circuits are widely used, e.g. in information transmission systems. Electronic circuits are typically very small but their operation speed is limited, whereas optical circuits are extremely fast but their sizes are limited by diffraction. An integration of optics and electronics would combine the huge optical bandwidth with the compactness of electronics.

Photodetectors are devices to bridge optical and electric circuits. Traditional photodetectors are usually used to convert dielectric optical signals to electronic signals. They generally have low photoresponsivity per unit volume and hence require a relatively large size. Surface plasmon polaritons (SPPs) have been applied to improve the photoresponsivity of metal-semiconductor-metal photodetectors. However, the size of the photodetector is still in the micrometer scale.

More recently, a nanoparticle-formed cavity has been used to concentrate light into a subwavelength volume. This makes it possible to develop the photodetector in nanometer scale. Typically, two nanoparticles are used as a nanoantenna and form a nanocavity in between, and two additional pieces of metal are used as the electrodes of the detector. The electrodes are perpendicular to the nanoantenna. The waveguide, where light is injected, is perpendicular to the plane defined by the electrodes and the nanoantenna. However, such photodetector still works with dielectric waveguides, which is still limited by diffraction. in addition, fabricating such system (waveguide and detector) may be very challenging.

A need therefore exists to provide a plasmonic detector that seeks to address at least one of the above problems.

SUMMARY

In accordance with a first aspect of the present invention, there is provided a plasmonic detector comprising:

two nanoscale metallic rods coupled to a bias voltage;

a nanoscale cavity formed between adjacent ends of the two nanoscale metallic rods; and an absorption material disposed in the nanoscale cavity for converting an electromagnetic field to an electric current for outputting via the nanoscale metallic rods.

At least one of a size and position of nanoscale metallic rods may be controlled for achieving a resonance of the electromagnetic field within the nanoscale cavity.

The plasmonic detector may be coupled to a subwavelength waveguide that directs the electromagnetic field to the plasmonic detector.

The position of the nanoscale metallic rods may be controlled based on a separation between the subwavelength waveguide and the nanoscale metallic rods.

The size of the nanoscale metallic rods may be controlled based on at least one of a free-space wavelength of the electromagnetic field, a gap distance of the nanoscale cavity, and the absorption material disposed in the nanoscale cavity.

The absorption material may convert the electromagnetic field to an electric current by converting photon energy in the electromagnetic field into excited electron-hole pairs.

The excited electron-hole pairs may be driven to the respective nanoscale metallic rods for forming the electric current under the influence of the bias voltage.

The absorption material may comprise a semiconductor material.

The absorption material may further extend outside of the nanoscale cavity around the adjacent ends of the two nanoscale metallic rods.

The plasmonic detector may further comprise two conducting wires coupled to the respective nanoscale metallic rods for connection with an external circuit.

The conducting wires may be perpendicular to a longitudinal axis of the nanoscale metallic rods.

The subwavelength waveguide may be co-planar with the nanoscale metallic rods.

The subwavelength waveguide may comprise one of a group consisting of a metal-insulator-metal waveguide, an insulator-metal-insulator waveguide, a nanoparticle waveguides, a groove, an optical fiber, and a Si photonic waveguide.

In accordance with a second aspect of the present invention, there is provided a method for manufacturing a plasmonic detector, the method comprising the steps of:

providing two nanoscale metallic rods coupled to a bias voltage;

forming a nanoscale cavity between adjacent ends of the two nanoscale metallic rods; and disposing an absorption material in the nanoscale cavity for converting an electromagnetic field to an electric current for outputting via the nanoscale metallic rods.

The method may further comprise controlling at least one of a size and position of the nanoscale metallic rods for achieving a resonance of the electromagnetic field within the nanoscale cavity.

The method may further comprise coupling a subwavelength waveguide that directs the electromagnetic field to the plasmonic detector.

The method may further comprise controlling the position of the nanoscale metallic rods based on a separation between the subwavelength waveguide and the nanoscale metallic rods.

The method may further comprise controlling the size of the nanoscale metallic rods based one at least one of a free-space wavelength of the electromagnetic field, a gap distance of the nanoscale cavity, and the absorption material disposed in the nanoscale cavity.

The absorption material may comprise a semiconductor material.

The method may further comprise disposing the absorption material extending outside of the nanoscale cavity around the adjacent ends of the two nanoscale metallic rods.

The method may further comprise coupling two conducting wires to the respective nanoscale metallic rods for connection with an external circuit.

The conducting wires may be perpendicular to a longitudinal axis of the nanoscale metallic rods.

The subwavelength waveguide may be co-planar with the nanoscale metallic rods.

The subwavelength waveguide may comprise one of a group consisting of a metal-insulator-metal waveguide, an insulator-metal-insulator waveguide, a nanoparticle waveguides, a groove, an optical fiber, and a Si photonic waveguide.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

The following example embodiments describe a plasmonic detector designed to convert an electromagnetic field from a subwavelength plasmonics waveguide to electronic current for electronic systems, that enables nanoscale optical transmission and detection, e.g. for on-chip interconnects with plasmonics. The plasmonic detector of the example embodiments typically comprises two nano-sized electrodes to form a subwavelength cavity, which is used to concentrate the electromagnetic field from the subwavelength plasmonic waveguide. Additional nanoparticles to form the nanocavity are not required in the example embodiments. Thus, the detector of the example embodiments may be ultra-compact. In addition, the waveguide and the detector may be formed in the same plane, which can provide ease of fabrication. Preferably, the cavity enhances the field by more than two orders in magnitude. In addition, with an absorption material filled only in the subwavelength cavity, the plasmonic detector of the example embodiment has a nanoscale active volume, resulting in picosecond transit time and very small capacitance. Thus, the plasmonic detector may have a high photoresponsivity per unit volume and can operate in terahertz (THz) speed.

Figure 1:
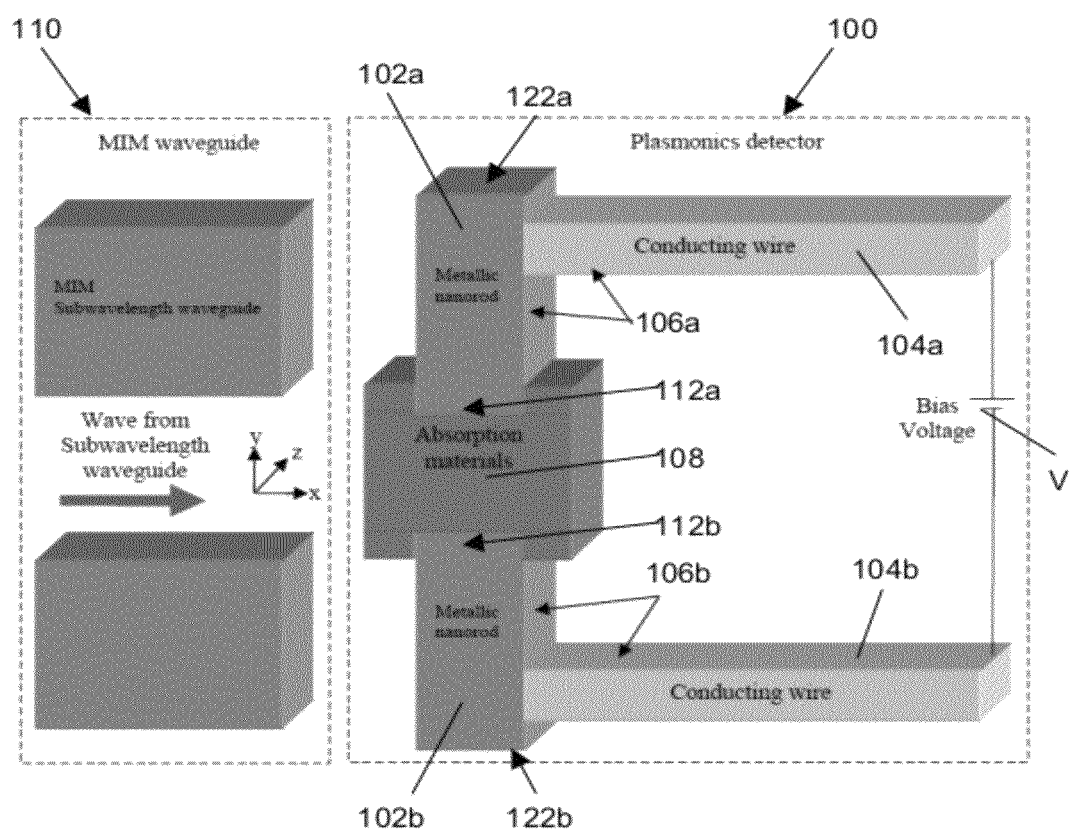
FIG. 1 shows a schematic diagram illustrating a plasmonic detector disposed adjacent to a subwavelength plasmonic waveguide according to an example embodiment.
Figure 2:
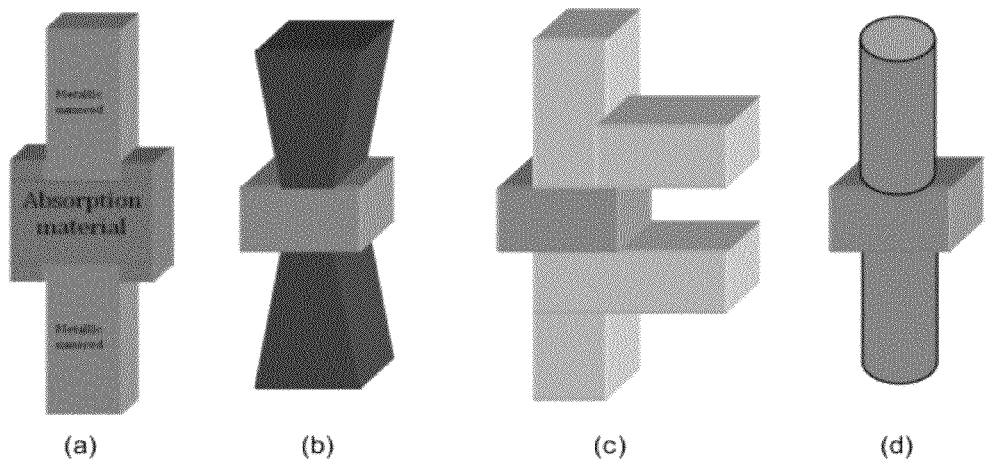
FIGS. 2(a)-2(d) show example plasmonic detectors illustrating different nanorod shapes.

FIG. 1 shows a schematic diagram illustrating a plasmonic detector 100 disposed adjacent to a subwavelength plasmonic waveguide 110 according to an example embodiment. The plasmonic detector 100 comprises two metallic nanoscale rods 102a, 102b (herein interchangeably referred to as "nanorods"), a nanoscale cavity 108 (herein interchangeably referred to as "nanocavity" or "nanorod cavity") formed between adjacent ends 112a, 112b of the two nanorods 102a, 102b respectively, and two conducting wires 104a, 104b coupled to the two nanorods 102a, 102b respectively. The nanorods 102a, 102b are co-planar with the subwavelength plasmonic waveguide 110. Typically, the nanocavity 108 couples and generates resonance of an electromagnetic field (not shown) within a nanoscale volume. An absorption (with respect to an electromagnetic field) material filled in the cavity converts photon energy to electron-hole pairs, which are driven to the two nanorods 102a, 102b to form a photocurrent. The transit time for the electron-hole pairs to be driven to the respective nanorods 102a, 102b in the example embodiment depends on the cavity gap distance and the absorption material. Typically, the transit time is in the range of about 1 to 10 picoseconds.

In the example embodiment, the two nanorods 102a, 102b are typically made of a metal, e.g. gold (Au), silver (Ag) or aluminium (Al). As can be seen from FIG. 1, the two nanorods 102a, 102b are disposed near the end of a subwavelength waveguide 110 to couple the electromagnetic field from the subwavelength waveguide 110. Preferably, the two metallic nanorods 102a, 102b share a common longitudinal axis (i.e. the nanorods 102a, 102b are collinear).

The optical nature of the metal and the nanoscale dimension of the nanorods 102a, 102b enable surface plasmon modes around the nanorods 102a, 102b in the example embodiment. The nanorods 102a, 102b, which comprise parts of the electrodes of the detector 100, also act as a nanoscale antenna in the example embodiment. By optimizing the dimension and location of the nanorods 102a, 102b, the nanocavity 108 can generate a near field resonance within a nanoscale volume in the gap between two nanorods 102a, 102b. As a result, the maximum electric field intensity is located in a nanoscale volume.

Typically, the dimensions of the nanorods 102a, 102b depend mainly on the input free-space wavelength, the dimensions of the nanocavity 108 as well as the absorption material filled in the nanocavity. As the two nanorods 102a, 102b and the absorption material in between form a half-wavelength dipole antenna in the example embodiment, the length between distal ends 122a, 122b of two nanorods 102a, 102b (i.e. the antenna length) is about half of the effective wavelength, which is generally much less than the input free-space wavelength. For example, the input free-space wavelength is about 1550 nanometers (nm), the absorption material is InGaAs, and the dimensions of the nanocavity are about 50nm×50nm×50nm. The optimised antenna length is about 390 nm, which means the effective wavelength is about 780 nm.

The metallic nanorods 102a, 102b in the example embodiment can be of different shapes. FIGS. 2(a)-2(d) show example plasmonic detectors illustrating different nanorod shapes including rectangle (FIG. 2(a)), trapezoidal or bow-tie shaped (FIG. 2(b)), L-shaped (FIG. 2(c)) and cylinder (FIG. 2(d)) respectively. Other shapes, e.g. ellipse (not shown), may be used in alternate embodiments. In addition, it will be appreciated that the metallic nanorods 102a, 102b also can be of different cross-sectional sizes and of different metals.

Figure 3:
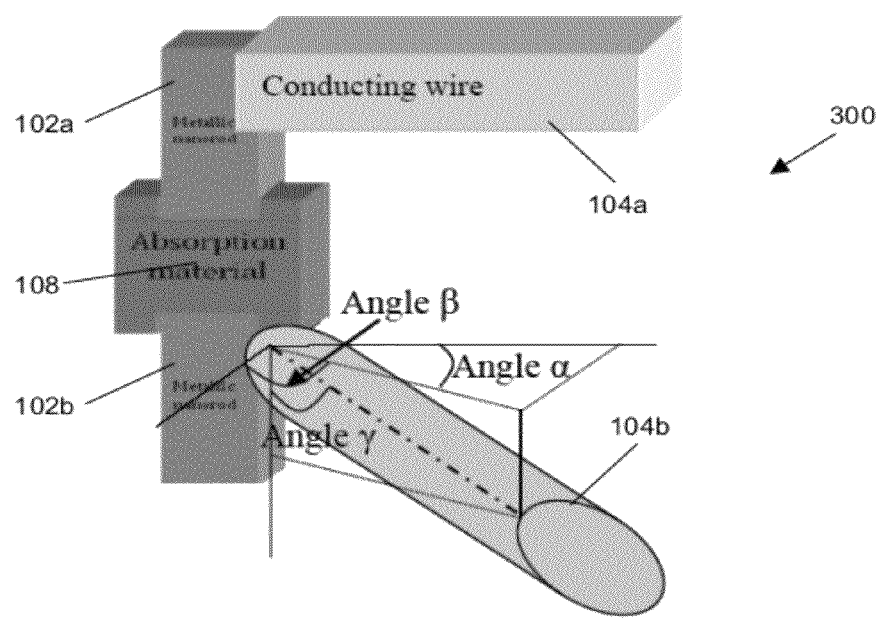
FIG. 3 shows an example plasmonic detector illustrating different angles between the conducting wire and the respective nanorod.
Figure 4:
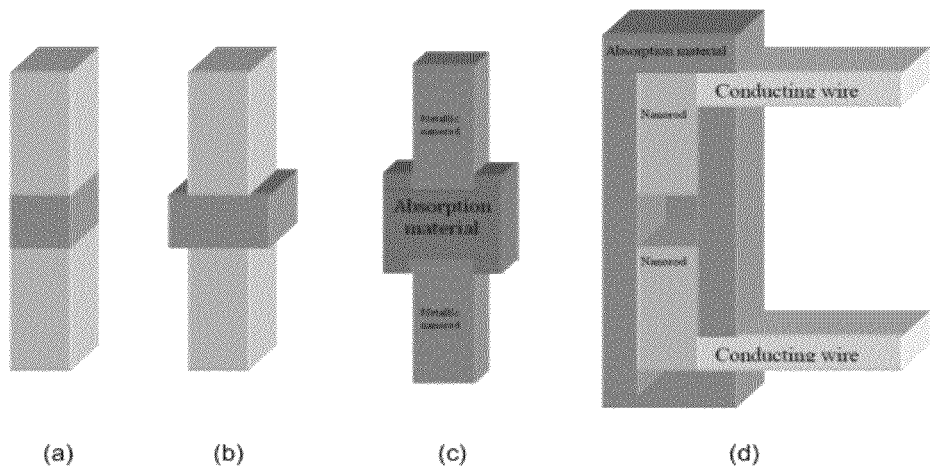
FIGS. 4(a)-4(d) show example plasmonic detectors illustrating different configurations of filling the absorption material in the nanocavity.

Referring to FIG. 1, the conducting wires 104a, 104b are connected to the metallic nanorods 102a, 102b to form two electrodes 106a, 106b respectively to apply a bias voltage V to the detector 100 and to conduct the photocurrent generated by the detector 100 by connecting to an external electronic circuit (not shown). In the example embodiment, the conducting wires 104a, 104b of the plasmonic detector can be of different shapes such as rectangular, cylindrical or elliptical shape, and of different sizes. Also, the conducting wires 104a, 104b can be of different conducting materials, such as metal, transparent conducting oxide (TCO). Furthermore, the conducting wires 104a, 104b can be at different positions and/or different angles relative to the nanorods 102a, 102b respectively. FIG. 3 shows an example plasmonic detector 300 illustrating different angles between the conducting wire 104b and the respective nanorod 102b.

In a preferred embodiment as illustrated in FIG. 1, the conducting wires 104a, 104b are connected to the nanorods 102a, 102b respectively in a direction perpendicular to the longitudinal axis of the nanorods 102a, 102b. This configuration may advantageously minimize geometry effects on the nanorod cavity 108 from the conducting wires 104a, 104b. As can be seen from FIG. 1, each conducting wire 104a, 104b is connected to one nanorod 102a, 102b e.g. from the x-direction or the z-direction, which is perpendicular to the longitudinal axis of nanorods 102a, 102b (y-direction). Preferably, the connecting wires 104a, 104b are disposed parallel to the x-direction. Both conducting wires 104a, 104b may be in the same direction (as in FIG. 1) or in different directions. The latter configuration typically has a smaller capacitance contributed from the electrodes 106a, 106b thus formed, but is also more difficult in fabrication. As discussed above, the conducting wires 104a, 104b are used to apply a bias voltage V to the detector 100 and conduct photocurrent generated by the detector 100. Thus, the wires 104a, 104b preferably have a large conductance and a small contact resistance.

As described above, an electromagnetic absorption material, e.g. a semiconductor material, is filled in the nanocavity 108 formed by the nanorods 102a, 102b. The selection of the absorption material depends on e.g. the free-space wavelength of the plasmonics wave (i.e. input frequency) and the substrate used in the fabrication. FIGS. 4(a)-4(d) show example plasmonic detectors illustrating different configurations of filling the absorption material in the nanocavity, such as flush with the two nanorods (FIG. 4(a)), extending out of the nanocavity (FIGS. 4(b) and 4(c)) or enclosing the two metallic nanorods (FIG. 4(d)). Preferably, the absorption material is filled in a volume slightly larger than the nanocavity between the nanorods (as in FIG. 4(c)) to maximize utilization of the resonant electric field energy.

As can also be seen from FIG. 1, a metal-insulator-metal (MIM) subwavelength waveguide 110 is used to propagate plasmonic waves in the example embodiment. The plasmonics detector 100 is disposed adjacent the end of the waveguide 110 to convert the plasmonic waves from the waveguide 110 to a photocurrent. In the example embodiment, the distance between the waveguide 110 and the detector 100 is about 50 nm. In the example embodiment, plasmonic waves reaching the end of the MIM waveguide 110 are coupled to the nanorod cavity 108 and resonant in the active area of the plasmonic detector 110.

The waveguide 110 mainly serves to provide a light source in the example embodiment. It can be any kind of plasmonic waveguide including but not limited to metal-insulator-metal waveguide, insulator-metal-insulator waveguide, nanoparticle waveguides, and grooves. Alternatively, it can be a traditional photonic waveguide such as optical fiber or Si photonic waveguide, or an optical output of an optical sensor or a plasmonic sensor.

Figure 5:
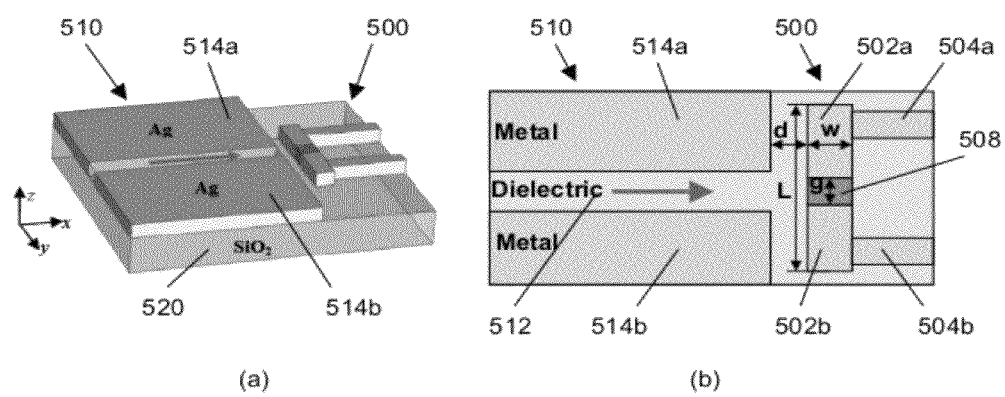
FIG. 5(a) shows a perspective view of a plasmonic detector and an MIM subwavelength waveguide according to an example embodiment.
FIG. 5(b) shows a plan view of the plasmonic detector and subwavelength waveguide of FIG. 5(a).
Figure 6A:
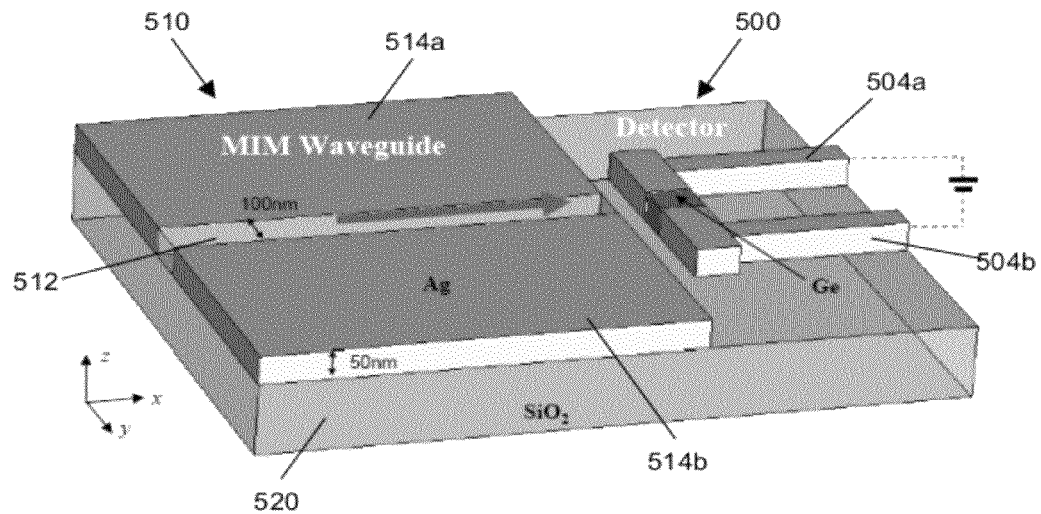
FIG. 6(a) shows an enlarged view of FIG. 5(a).
Figure 6B:
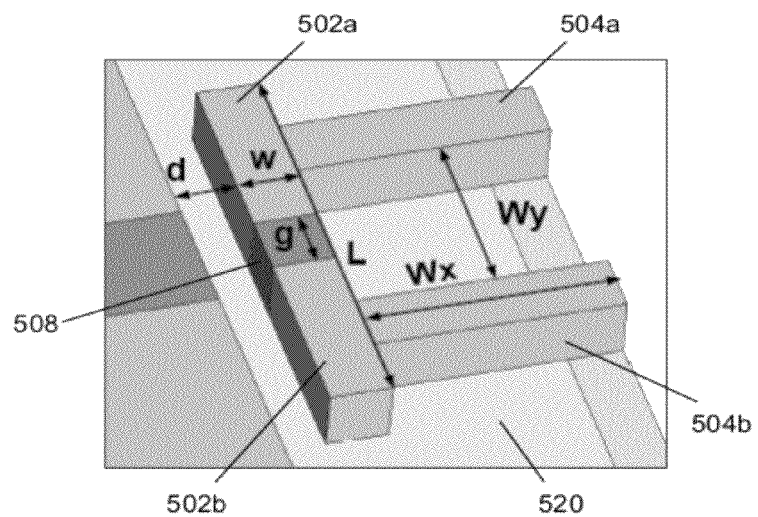
FIG. 6(b) shows a detailed view of the plasmonic detector of FIG. 6(a).

FIG. 5(a) shows a perspective view of a plasmonic detector 500 and an MIM subwavelength waveguide 510 according to an example embodiment. FIG. 5(b) shows a plan view of the plasmonic detector 500 and subwavelength waveguide 510 of FIG. 5(a). FIG. 6(a) shows an enlarged view of FIG. 5(a). FIG. 6(b) shows a detailed view of the plasmonic detector 500 of FIG. 6(a).

In the example embodiment, the MIM subwavelength waveguide 510 is built with a silicon oxide ($SiO_2$) slot 512 of about 100 nanometers (nm) wide disposed between two pieces of silver (Ag) metallic thin films 514a, 514b each having a thickness of about 50 nm. The nanorod cavity 508 is formed between two Ag nanorods 502a, 502b. The nanorod cavity 508 is filled with an absorption material e.g. Germanium (Ge) or Indium Gallium Arsenide (InGaAs). The conducting wires 504a, 505b are also made of Ag nanorods in the example embodiment. Further, the plasmonic detector 500 and the MIM subwavelength waveguide 510 are embedded on a $SiO_2$ substrate 520. Using the above dimensions, the electromagnetic field compatible with the structure of FIGS. 5 and 6 is typically in the near-infrared range. For example, a free-space wavelength $\lambda=1.55$ micrometers ($\mu m$) is used in the example embodiment comprising InGaAs as the absorption material, and the values of the separation d, width w of the nanorod, nanocavity gap g, antenna length L and distance Wy between connecting wires as shown in FIG. 6(b) are about 50 nm, 50 nm, 50 nm, and 160 nm respectively. In an alternate embodiment where Ge is used as the absorption material, the value of L is about 370 nm. The length Wx of the connecting wires 104a, 104b typically varies depending on the actual application and can e.g. be more than one micrometer. It will be appreciated that an embodiment of the present invention can be fabricated using existing thin film fabrication techniques which are understood in the art.

As described above, the absorption material inside the nanorod cavity 508 converts photon energy into excited electron-hole pairs. The electrons and holes are driven to the two nanorods 502a, 502b separately to form a photocurrent that is outputted via conducting wires 504a, 504b in the example embodiment. The performance of the nanorod cavity 508 typically depends strongly on the dimension and location of the nanorods 502a, 502b, which are associated with free-space wavelength and the plasmonic waveguide used.

Figure 7A:
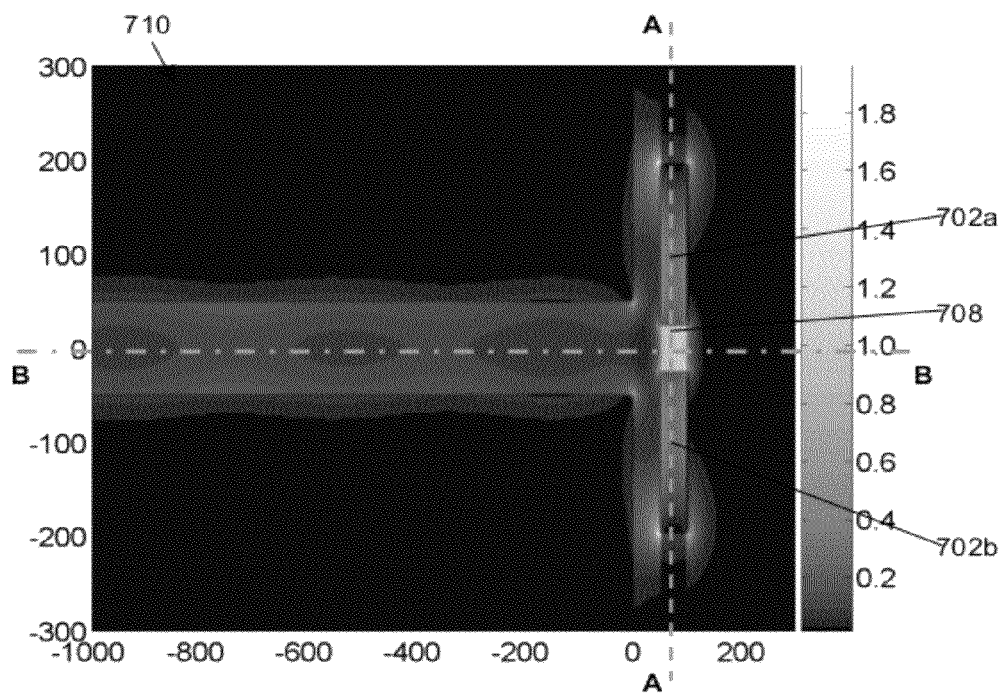
FIG. 7(a) shows a plan view of the electric field intensity distribution along the MIM waveguide and around the nanorods according to an example embodiment.
Figure 7B:
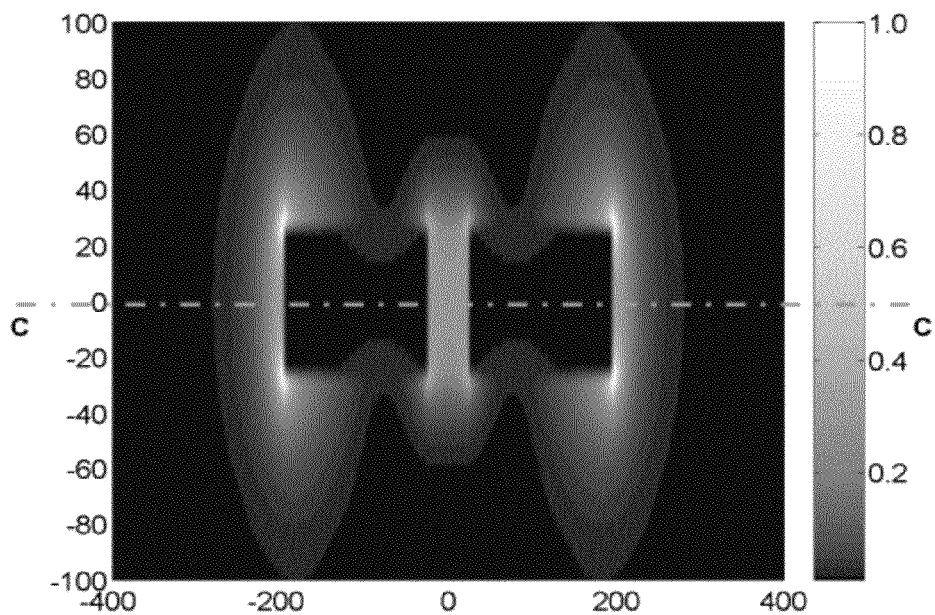
FIG. 7(b) shows a sectional view of the electric field intensity distribution along the line A-A of FIG. 7(a).
Figure 7C:
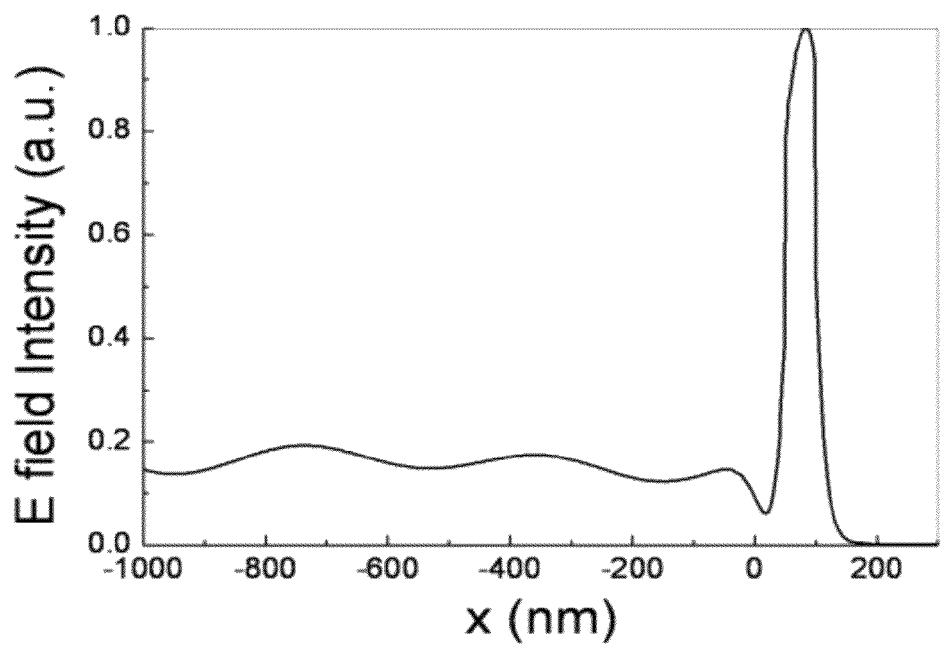
FIG. 7(c) shows a graph illustrating the calculated electric field intensity distribution along the line B-B of FIG. 7(a).
Figure 7D:
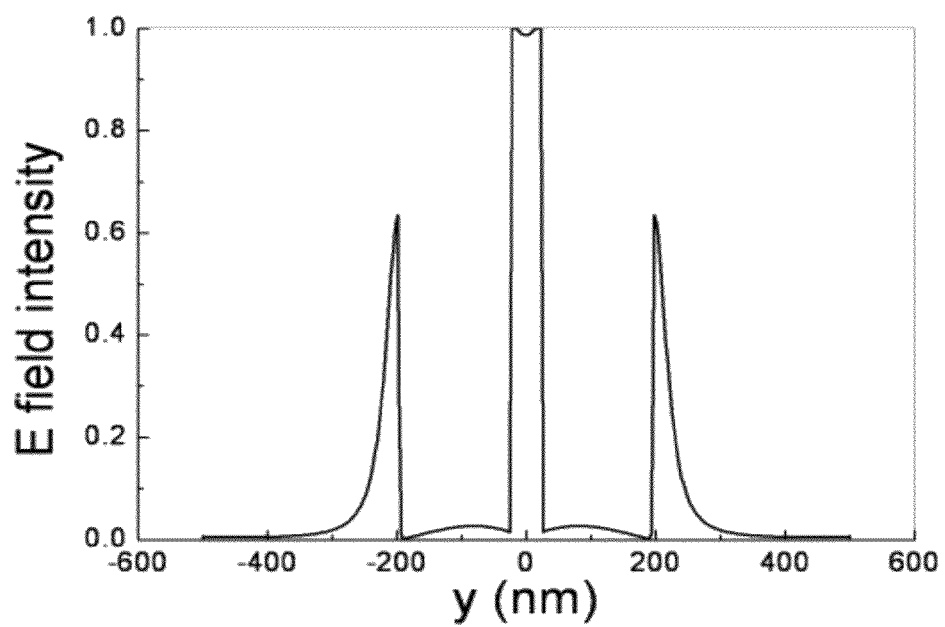
FIG. 7(d) shows a graph illustrating the calculated electric field intensity distribution along the line C-C of FIG. 7(b).

FIG. 7(a) shows a plan view of the calculated electric field intensity distribution along the MIM waveguide 710 and around the nanorods 702a, 702b according to an example embodiment. FIG. 7(b) shows a sectional view of the calculated electric field intensity distribution along the line A-A of FIG. 7(a). FIG. 7(c) shows a graph illustrating the calculated electric field intensity distribution along the line B-B of FIG. 7(a). FIG. 7(d) shows a graph illustrating the calculated electric field intensity distribution along the line C-C of FIG. 7(b).

As can be seen in FIGS. 7(a) and 7(c), a strong near-field is generated around the nanorods 702a, 702b because of resonance of the surface plasmon polaritons. In the example embodiment, the strongest electric field is located in the gap between the nanorods 702a, 702b, i.e. the nanorod cavity 708 (which is filled with InGaAs in the example embodiment), as shown in FIGS. 7(b) and 7(d).

The electric field energy can be enhanced by more than two orders in magnitude in the example embodiment with optimal design of nanorod cavity 708. As described above (with respect to FIG. 1), a nanoantenna is formed by the two nanorods in the y-direction, which corresponds to the direction of the electric field in the waveguide. When the nanoantenna operates at the resonant frequency, the maximum electromagnetic energy is received from the waveguide. The gap distance may control the resonant field in the nanocavity as the two nanorods together with the material inside the nanocavity form a planar capacitor in the example embodiment. The smaller the gap, the larger the capacitance is, and therefore, the stronger the electric field is. However, a smaller gap means a smaller active volume and hence, less absorption by the detector. As such, by optimising the gap distance based on the maximum absorption in the gap, maximum optical energy from the waveguide is concentrated in the gap or nanocavity in the example embodiment. This may be advantageous for designing a high-speed and high photoresponsivity detector.

Figure 8:
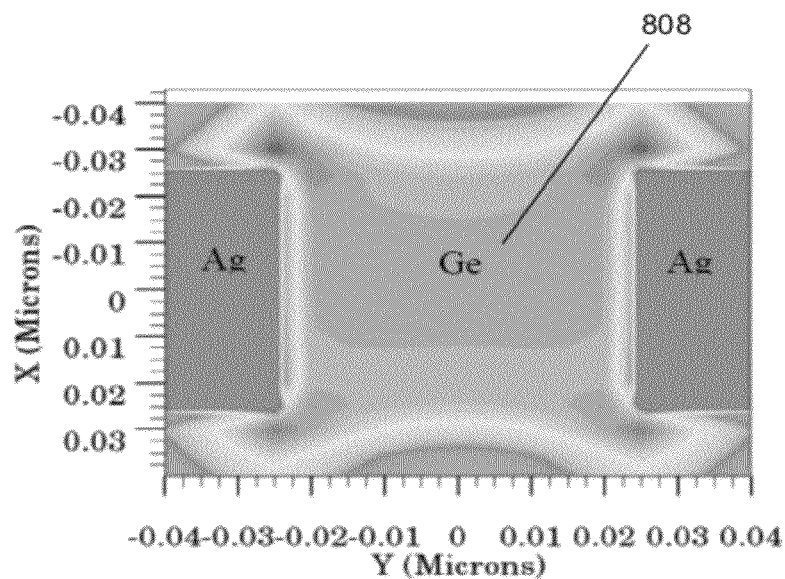
FIG. 8 shows a photogeneration distribution inside a nanorod cavity filled with Ge as the absorption material according to an example embodiment.

FIG. 8 shows a photogeneration distribution inside a nanorod cavity 808 filled with Ge as the absorption material according to an example embodiment. It can be seen from FIG. 8 that the photogeneration rate is proportional to the electric field intensity distribution (as illustrated in FIGS. 7(a) to 7(d)) in the cavity 808. In FIG. 8, the active area in the X-Y plane is about 50 nm×50 nm.

Figure 9:
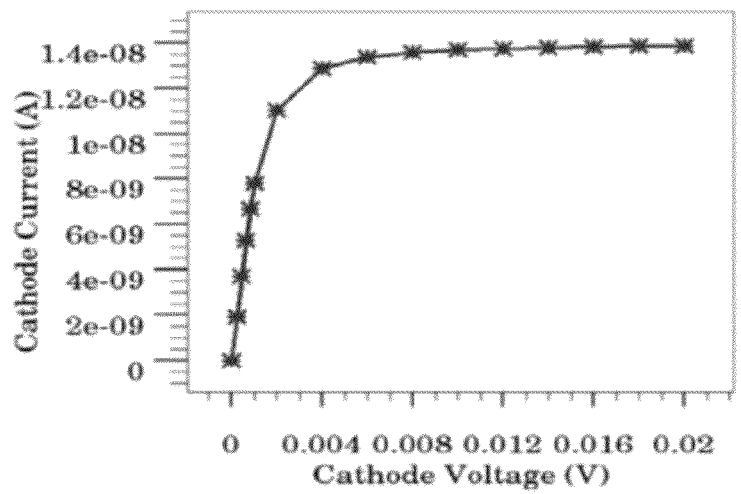
FIG. 9 shows a graph illustrating the relationship between the photocurrent of the plasmonic detector and the applied bias voltage according to an example embodiment.

FIG. 9 shows a graph 900 illustrating the relationship between the photocurrent of the plasmonics detector and the applied bias voltage according to an example embodiment. It can be seen from FIG. 9 that the photocurrent increases substantially fast for small values of bias voltage, and stablises after the applied bias voltage reaches about 0.008 Volt (V).

The plasmonic detector of the example embodiments may be a potential candidate for a very large bandwidth, very high photoresponsivity and very low power consumption device to bridge photonic circuits and electronic circuits. Preferably, the detector of the example embodiment has a nanoscale active region (about 50 nm×50 nm ×50 nm). It will be appreciated that, at such a small size, the transit time for the photoexcited carriers driven to the electrodes may be about one picosecond (ps). The transit time may be longer (in the range of about 1 to 10 ps) depending on the cavity gap distance and the absorption material. Advantageously, this can greatly reduce the chances for carrier recombination, resulting in high photoresponsivity. Moreover, as the dark current created in the nanoscale volume is substantially small, power consumption is typically very low. in the example embodiment, the capacitance between the two nanorods is about 3 attofarad (aF) using simple parallel plate capacitor model. Advantageously, this may allow a relatively larger external resistance. Further, the detector of the example embodiments is able to operate at THz frequency range.

In other words, using electrodes to form a nanoscale cavity inside the plasmonic detector in the above example embodiments may advantageously enhance the electric field coupling from the waveguide to the detector (resulting in high photoresponsivity per unit volume), reduce the size of the detector (resulting in high compactness), reduce the carrier transit time and capacitance (resulting in high speed), and reduce bias voltage (resulting in low power consumption).

Moreover, the nanorods that form the nanorod cavity also act as electrodes of the detector. This may make the detector of the example embodiment highly compatible with electronic circuits, e.g. for on-chip optical interconnects, and plasmonics sensors where an electronic output is required.

Figure 10:
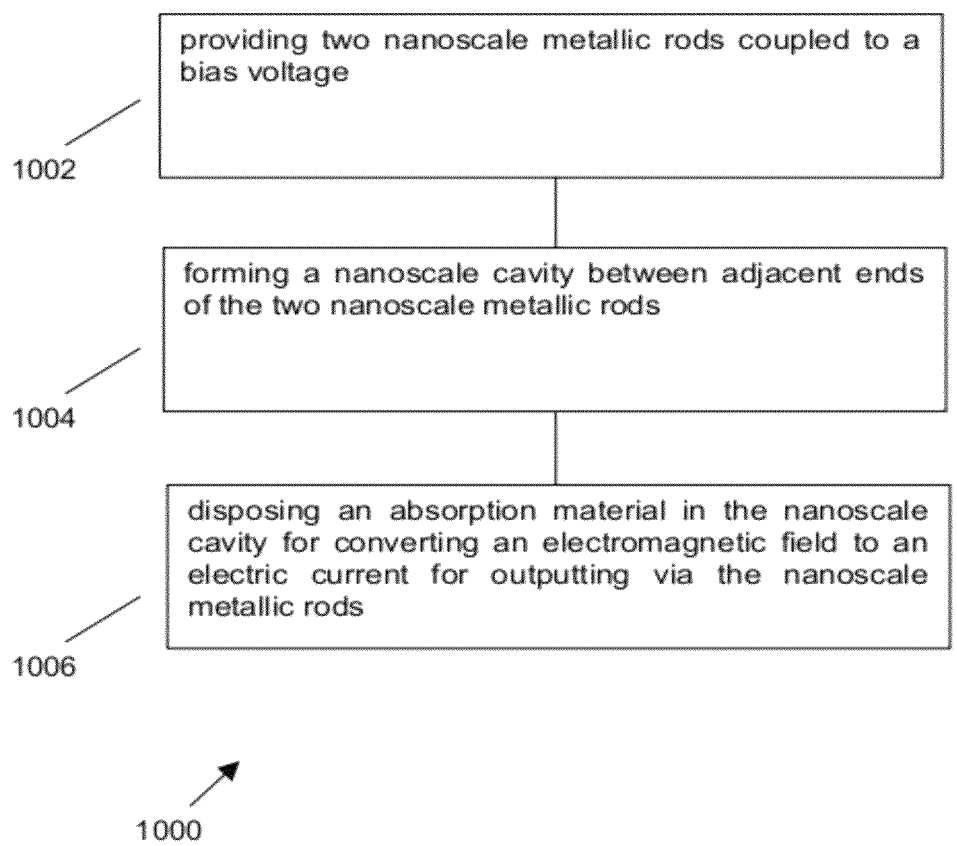
FIG. 10 shows a flowchart illustrating a method for manufacturing a plasmonic detector according to an example embodiment.

FIG. 10 shows a flowchart 1000 illustrating a method for manufacturing a plasmonic detector according to an example embodiment. At step 1002, two nanoscale metallic rods coupled to a bias voltage are provided. At step 1004, a nanoscale cavity is formed between adjacent ends of the two nanoscale metallic rods. At step 1006, an absorption material is disposed in the nanoscale cavity for converting an electromagnetic field to an electric current for outputting via the nanoscale metallic rods.

Preferably, the method of the example embodiment further comprises a step of controlling at least one of a size and position of the nanoscale metallic rods for achieving a resonance of the electromagnetic field within the nanoscale cavity.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A plasmonic detector comprising:
   two nanoscale metallic rods coupled to a bias voltage;
   a nanoscale cavity formed between adjacent ends of the two nanoscale metallic rods; and
   an absorption material disposed in the nanoscale cavity for converting an electromagnetic field to an electric current for outputting via the nanoscale metallic rods.

2. The plasmonic detector as claimed in claim 1, wherein at least one of a size and position of nanoscale metallic rods are controlled for achieving a resonance of the electromagnetic field within the nanoscale cavity.

3. The plasmonic detector as claimed in claim 1, coupled to a subwavelength waveguide that directs the electromagnetic field to the plasmonic detector.

4. The plasmonic detector as claimed in claim 3, wherein the position of the nanoscale metallic rods is controlled based on a separation between the subwavelength waveguide and the nanoscale metallic rods.

5. The plasmonic detector as claimed in claim 2, wherein the size of the nanoscale metallic rods is controlled based on at least one of a free-space wavelength of the electromagnetic field, a gap distance of the nanoscale cavity, and the absorption material disposed in the nanoscale cavity.

6. The plasmonic detector as claimed in claim 1, wherein the absorption material converts the electromagnetic field to an electric current by converting photon energy in the electromagnetic field into excited electron-hole pairs.

7. The plasmonic detector as claimed in claim 6, wherein the excited electron-hole pairs are driven to the respective nanoscale metallic rods for forming the electric current under the influence of the bias voltage.

8. The plasmonic detector as claimed in claim 1, wherein the absorption material comprises a semiconductor material.

9. The plasmonic detector as claimed in claim 1, wherein the absorption material further extends outside of the nanoscale cavity around the adjacent ends of the two nanoscale metallic rods.

10. The plasmonic detector as claimed in claim 1, further comprising two conducting wires coupled to the respective nanoscale metallic rods for connection with an external circuit.

11. The plasmonic detector as claimed in claim 10, wherein the conducting wires are perpendicular to a longitudinal axis of the nanoscale metallic rods.

12. The plasmonic detector as claimed in claim 3, wherein the subwavelength waveguide is co-planar with the nanoscale metallic rods.

13. The plasmonic detector as claimed in claim 3, wherein the subwavelength waveguide comprises one of a group consisting of a metal-insulator-metal waveguide, an insulatormetal-insulator waveguide, a nanoparticle waveguides, a groove, an optical fiber, and a Si photonic waveguide.

14. A method for manufacturing a plasmonic detector, the method comprising the steps of:
  providing two nanoscale metallic rods coupled to a bias voltage;
  forming a nanoscale cavity between adjacent ends of the two nanoscale metallic rods; and
  disposing an absorption material in the nanoscale cavity for converting an electromagnetic field to an electric current for outputting via the nanoscale metallic rods.

15. The method as claimed in claim 14, further comprising controlling at least one of a size and position of the nanoscale metallic rods for achieving a resonance of the electromagnetic field within the nanoscale cavity.

16. The method as claimed in claim 14, further comprising coupling a subwavelength waveguide that directs the electromagnetic field to the plasmonic detector.

17. The method as claimed in claim 16, further comprising controlling the position of the nanoscale metallic rods based on a separation between the subwavelength waveguide and the nanoscale metallic rods.

18. The method as claimed in claim 15, further comprising controlling the size of the nanoscale metallic rods based one at least one of a free-space wavelength of the electromagnetic field, a gap distance of the nanoscale cavity, and the absorption material disposed in the nanoscale cavity.

19. The method as claimed in claim 14, wherein the absorption material comprises a semiconductor material.

20. The method as claimed in claim 14, further comprising disposing the absorption material extending outside of the nanoscale cavity around the adjacent ends of the two nanoscale metallic rods.

21. The method as claimed in claim 14, further comprising coupling two conducting wires to the respective nanoscale metallic rods for connection with an external circuit.

22. The method as claimed in claim 21, wherein the conducting wires are perpendicular to a longitudinal axis of the nanoscale metallic rods.

23. The method as claimed in claim 16, wherein the subwavelength waveguide is co-planar with the nanoscale metallic rods.

24. The method as claimed in claim 16, wherein the subwavelength waveguide comprises one of a group consisting of a metal-insulator-metal waveguide, an insulator-metal-insulator waveguide, a nanoparticle waveguides, a groove, an optical fiber, and a Si photonic waveguide.

* * * * *